(12) United States Patent
Haubrich et al.

(10) Patent No.: US 9,399,848 B2
(45) Date of Patent: Jul. 26, 2016

(54) REFUSE COMPACTOR

(71) Applicant: BOMAG GmbH, Boppard (DE)

(72) Inventors: Thomas Haubrich, Goedenroth (DE); Peter Vollrath, Belgweiler (DE); Peter Stein, Leiningen (DE); Hagen Stein, Langenthal (CH)

(73) Assignee: BOMAG GmbH, Boppard (DE)

( * ) Notice: Subject to any disclaimer, the term of this patent is extended or adjusted under 35 U.S.C. 154(b) by 12 days.

(21) Appl. No.: 14/493,848

(22) Filed: Sep. 23, 2014

(65) Prior Publication Data

US 2015/0093196 A1    Apr. 2, 2015

(30) Foreign Application Priority Data

Sep. 27, 2013   (DE) .......................... 10 2013 016 127

(51) Int. Cl.
*E02D 3/026*    (2006.01)
*E02D 3/039*    (2006.01)
*B62D 33/06*    (2006.01)

(52) U.S. Cl.
CPC ................ *E02D 3/026* (2013.01); *B62D 33/06* (2013.01); *E02D 3/039* (2013.01)

(58) Field of Classification Search
CPC ....... E02D 3/0265; E02D 3/032; E02D 3/039; E02D 3/046; E02D 3/026; E01C 19/264; E01C 19/002; E01C 19/4866; E01C 19/286; E01C 19/38; B62D 33/06
USPC .............................. 414/704, 722, 740; 37/406
See application file for complete search history.

(56) References Cited

U.S. PATENT DOCUMENTS

| | | |
|---|---|---|
| 2,510,817 A | 6/1950 | Greiner et al. |
| 3,183,804 A | 5/1965 | Le Tourneau |
| 3,450,013 A | 6/1969 | Peterson |
| 3,866,781 A | 2/1975 | Stedman et al. |
| D326,858 S | 6/1992 | Skeel et al. |
| 5,413,188 A * | 5/1995 | Ui .......................... B60J 5/0487 180/89.12 |
| D516,094 S | 2/2006 | Dotsch et al. |
| D540,352 S | 4/2007 | Sato et al. |
| D549,738 S | 8/2007 | Hiraoka et al. |
| D592,682 S | 5/2009 | Haubrich et al. |
| D607,473 S | 1/2010 | Haubrich et al. |
| D676,463 S | 2/2013 | Ewringmann et al. |
| 8,695,722 B2 * | 4/2014 | Fukazawa .............. B60K 11/04 172/811 |
| 2001/0006128 A1* | 7/2001 | Contoli ................... E02F 3/286 180/68.4 |
| 2006/0070533 A1 | 4/2006 | Silcock et al. |
| 2011/0250832 A1* | 10/2011 | Mayr ................. B60H 1/00378 454/237 |
| 2014/0158387 A1* | 6/2014 | Fukazawa ............. B60K 11/04 172/292 |

FOREIGN PATENT DOCUMENTS

DE   94 13 270 U1   10/1994
JP   2002206253 A  *  7/2002

OTHER PUBLICATIONS

BOMAG GmbH, English Machine Translation of Brochure, Easy Maintenance, retrieved from http://pdf.directindustry.com/pdf/bomag/bomag-bc-572-bc-672-bc-7..., retrieved on Sep. 17, 2014 (2 pages).

(Continued)

*Primary Examiner* — Abigail A Risic
(74) *Attorney, Agent, or Firm* — Wood, Herron & Evans, LLP

(57) ABSTRACT

A refuse compactor, comprising a machine frame, transportation devices, a drive motor, a driver's cab which is arranged on the machine frame, and an air intake device with at least one intake opening, wherein the air intake device is arranged in the forward direction behind the driver's cab and extends at least partly over the rear side of the driver's cab up to the roof of the driver's cab in the vertical direction.

11 Claims, 5 Drawing Sheets

(56) References Cited

OTHER PUBLICATIONS

Espacenet, English Machine Translation of Application No. DE9413270U1, Published on Oct. 6, 1994 retrieved from http://worldwide.espacent.com on Sep. 19, 2014 (10 pages).

German Patent Office, English Machine Translation of Claim 1 for Application No. DE9413270U1, published on Oct. 6, 1994 (1 page).

OHIM—Office for Harmonization in the Internal Market Trademarks and Designs, Certificate of Registration issued for European Community Design No. 000638317-0001, dated Dec. 15, 2006 (5 pages).

OHIM—Office for Harmonization in the Internal Market Trademarks and Designs, Certificate of Registration issued for European Community Design No. 000638317-0002, dated Dec. 15, 2006 (5 pages).

* cited by examiner

REFUSE COMPACTOR

CROSS-REFERENCE TO RELATED APPLICATIONS

The present application claims priority under 35 U.S.C. §119 of German Patent Application No. 10 2013 016 127.4, filed Sep. 27, 2013, the disclosure of which is hereby incorporated herein by reference in its entirety.

FIELD OF THE INVENTION

The present invention relates to a refuse compactor, comprising a machine frame, transportation devices, a drive motor, a driver's cab which is arranged on the machine frame, and an air intake device with at least one intake opening, wherein the air intake device is arranged in the forward direction behind the driver's cab and extends at least partly over the rear side of the driver's cab up to the roof of the driver's cab or up to the height of the roof of the driver's cab in the vertical direction.

BACKGROUND OF THE INVENTION

Such refuse compactors are typically used on landfills for distributing, crushing and/or compacting refuse. Such special refuse compactors are known from the models BC 472 RB, BC 472 RS, BC 772 RB-2/RB-3/RS-2/RS-3 and BC 972 RB-3 of the Applicant and have been highly successful.

The basic configuration of such refuse compactors comprises a machine frame, for example, with a front frame and a rear frame which are joined together via an articulated joint. Furthermore, a drive motor is provided, which is usually a powerful internal combustion engine, by means of which the drive power is made available which is necessary for the operation of the refuse compactor. The drive motor is also used among other things for propelling transportation devices for driving operations, which may concern padfoot drums, for example. A driver's cab is further arranged on the machine frame, which is frequently vibration-dampened in relation to the machine frame. The driver's cab especially concerns an enclosed and air-conditioned driver's cab, which is also provided, for example, with fresh air supply in order to provide the driver with a working atmosphere which is separate from the outer environment. This is especially desirable in cases where the refuse compactor is used in landfill regions of hazardous potential. Further, especially for the purpose of distributing refuse, such refuse compactors typically comprise a push blade in the front region, with which the refuse can be displaced over the area of the landfill. For effective operation of the refuse compactor it is necessary to provide sufficient air supply of the drive motor, in particular, especially for cooling purposes and for ensuring an optimal combustion process. An air intake device is provided for this purpose, via which ambient air is sucked in and is supplied to a radiator and/or the combustion engine for cooling purposes in particular.

Since refuse compactors are frequently used in very dusty and particle-loaded environments, and, furthermore, have an increased need for cooling air due to long operating intervals of the internal combustion engine in the high-load range, the intake openings of the air intake device, which frequently can be part of a filter device, are preferably situated at a higher altitude, especially at the altitude of the driver's cab. Respective fans are further provided for the intake of air. The air intake device further comprises a housing, through which the suction air is guided at least for a partial range to the internal combustion engine, which is usually arranged in a covered manner beneath a hood and at a comparatively low position for reasons concerning the center of gravity. In conventional refuse compactors, the air intake device is frequently arranged behind the driver's cab in the forward direction of the refuse compactor, thus strongly limiting the driver's field of vision to the rear. The Applicant has solved this problem in its refuse compactors in such a way that thick side rails of the air intake device are arranged as a part of its housing for air guidance on the left and right side and behind the driver's cab, between which it is possible to see straight to the rear. These side rails prevent so-called side vision however, i.e., the vision of the driver from the driver's cab to the side over his shoulder to the rear. This is regularly perceived by drivers of such refuse compactors as disadvantageous and further represents a considerable operational risk due to the limited field of vision for the driver.

It is therefore the object of the present invention to provide a refuse compactor which allows efficient operation in combination with a high level of comfort in said operation.

SUMMARY OF THE INVENTION

According to one aspect of the present invention, the housing of the air intake device is arranged with a vision recess, which allows optimized visual conditions for the driver to the rear, especially allowing the driver to take a look over the shoulder, and which simultaneously provides optimized and reliable air guidance from the intake openings of the air intake device to the radiator and/or internal combustion engine. It is now provided for this purpose that the air intake device comprises at least one vision recess which is open to one side of the refuse compactor and which is arranged in the manner that a driver of the refuse compactor is able to see the region situated behind the refuse compactor at least in part from the driver's cab through the vision recess. In other words, the vision recess is arranged as a depression in the housing of the air intake device which is directed from the side towards the center of the machine. As a result of the fact that the vision recess is open towards the side of the refuse compactor, the driver—when turning the head in a rearward direction to the left or looking through the left side mirror—is able to see to the rear along the vision recess in the case of a vision recess situated on the left side and open towards the left side, thus providing a considerably larger field of vision than in previously used refuse compactors. The vision recess thus provides a kind of a channel of vision, which is arranged in the manner that the driver is able to see the region situated behind the refuse compactor through the channel. "Open towards one side of the refuse compactor" means that the vision recess is not arranged circumferentially, but that it is open towards a longitudinal side of the refuse compactor. The longitudinal sides of the refuse compactor are the exterior sides of the refuse compactor extending in the working direction, perpendicularly to the horizontal plane. The longitudinal sides are also generally referred to as the right and left side of the refuse compactor. The vision recess therefore has the shape of a depression, especially extending longitudinally in the working direction, as seen from the rear in the working direction towards the refuse compactor. The side to which the vision recess is open is thus the side of the refuse compactor which is situated substantially parallel to the working direction of the refuse compactor during straight travel. The planes of the sides designated in accordance with the present invention are therefore substantially rectangular to a straight line extending in the horizontal direction and transversely to the working direction of the refuse compactor. Due to the fact that the vision recess is provided with an open arrangement to at least one side, i.e., to the right or left, no massive exterior side rail blocks the view to the rear on this side. This substantially improves the visual conditions for the driver in this area.

A broad spectrum of designs of the air intake device can principally be used according to the present invention. It is preferable, however, if the air intake device, originating from an upwardly extending central part, comprises one respective vision recess on both sides of the refuse compactor. This again concerns the sides which are situated substantially parallel to the working direction of the refuse compactor during straight travel of said compactor. The refuse compactor thus comprises two such sides, wherein one of the vision recesses is always arranged to be open to only one of the two sides. In other words, it concerns the left and right side of the refuse compactor. The front and rear side of the refuse compactor situated at the front and the rear in the working direction are explicitly not meant. The air intake device thus comprises in this embodiment at least one central part protruding upwardly in the manner of a smokestack, which is ideally arranged to extend centrally on both sides and in the vertical direction with respect to the refuse compactor. The air intake device is thus arranged in this region in a relatively narrow way at the altitude of the at least one vision recess, especially in comparison to the driver's cab. In order to still provide a sufficiently large intake area for the ambient air, a roof or head region which expands at least in the width of the machine is preferably adjacent to said comparatively narrow central part, in which one or several intake openings are integrated over a large area. In summary, the air intake device therefore comprises a preferably T-shaped basic structure in the vertical sectional view transversely to the forward direction of the refuse compactor. The provision of a vision recess on both sides allows optimized visual conditions towards both rear sides of the refuse compactor. Concerning its exterior surface, the air intake device is further arranged in an especially preferred manner symmetrically with respect to both sides of the refuse compactor. In this way, the same visual conditions for the driver are provided on both sides. The head region is ideally further arranged in such a way that it is substantially flush with the driver's cab in the upward direction and/or to the sides.

It is preferred to arrange the width of the vision recess as large as possible in order to keep the extent of the visual obstruction by the air intake device as small as possible. However, efficient and sufficient air guidance from the intake openings of the air intake device towards the drive motor must be ensured. It has been found in practical use that the minimum width of the vision recess in the horizontal direction and transversely to the forward direction lies at most in the range of 0.1 to 0.4, particularly, 0.15 to 0.3, and, more particularly, 0.2 to 0.25 of the width of the driver's cab. The width designates the respective horizontal distance of the exterior surfaces of the air intake device transversely to the forward direction of the refuse compactor, thus to the right and to the left from the driver's view. It has been found that already a considerable improvement in the visual conditions for the driver is achieved in these regions on the one hand and the air guidance region enclosed by the air intake device is still dimensioned in a sufficiently large way on the other hand.

Partial regions of the drive motor or the hood that covers said motor frequently protrude upwardly and/or extend to the sides of the refuse compactor. The refuse compactor is now arranged in such a manner according to one aspect of the present invention that the at least one vision recess extends in the longitudinal direction of the refuse compactor from the rear side of the driver's cab up until close to the rear end of the refuse compactor. This means, in particular, that it preferably continues from the air intake device especially further to the motor hood and forms a vision recess extending over the entire rear region beyond the air intake device and the motor hood. The vision recess thus forms a depression situated substantially parallel to the longitudinal axis of the refuse compactor. The depression can extend through all elements of the refuse compactor in order to provide a channel of vision extending from the driver's cab to the rear. In this embodiment, further elements of the refuse compactor are thus also used for forming and shaping in addition to the air intake device, thus providing especially optimized visual conditions. Beside the motor hood, further typical elements in which the vision recess can continue are handrails and/or exhaust elements and/or other components of the refuse compactor that are potentially situated in the driver's rear field of vision. The suction air is guided on the inside from the air intake device coming from vertically above in the downward direction past the depression forming the vision recess according to one aspect of the present invention, without excessively impairing the view of the driver in the working direction to the rear.

The air intake device is ideally a part of an ROPS structure. ROPS (rollover protective structure) generally designates rollover protection. Such structures are intended to prevent excessive deformation of the driver's cab for the protection of the driver in the event of collision, for example, during tilting of the refuse compactor. It is known to provide the driver's cab with a suitable ROPS structure, for example, in the form of a frame and/or grid structure. According to one embodiment of the present invention, however, provision is made for an arrangement of the air intake device in such a manner that it also acts at least partly as an ROPS structure for the driver's cab. In other words, the air intake device is preferably arranged in the manner that it can absorb and/or discharge forces at least in part which act on the driver's cab especially in the case of a collision. The air intake device is connected for this purpose in an especially preferred manner to the driver's cab, especially its rear side, wherein a transfer of forces from the driver's cab to the air intake device is possible via the connection. It is principally possible in this respect to connect the driver's cab directly to the air intake device, wherein a comparatively stiff connection is then usually obtained. The connection is preferably provided in an indirect fashion, so that the air intake device is connected indirectly to the driver's cab, especially its rear side, for example, via a connecting device.

A broad spectrum of alternative possibilities can be used for the specific arrangement of the connecting device as long as a stable and sufficiently strong connection is ensured between the driver's cab and the air intake device. The connecting device, therefore, preferably also comprises elastomeric connecting elements, for example, such as, for example, rubber pads. Although such elements provide a partly elastic connection, they also provide a sufficiently strong connection between the driver's cab and the air intake device. Retaining lugs are preferably provided on the driver's cab and/or on the air intake device for connecting the elastomeric connecting elements of the connecting device, which retaining lugs are arranged for accommodating at least one elastomeric connecting element. The retaining lugs on the driver's cab and/or the air intake device are ideally arranged horizontally and transversely to the forward direction of the refuse compactor adjacent to each other and opposite of each other per elastomeric connecting element. This means, in particular, that a lateral pressure load on the driver's cab produces a pressure or tensile load on the connecting device and, in particular, the elastomeric connecting elements. Such pressure or tensile loads are substantially less critical for the transfer of forces than heavy loads, which in individual cases can cause a comparatively early failure of one or several elastomeric connecting elements.

As already described above, it is thus provided according to one embodiment of the present invention that the air intake device, as seen in the forward direction of the refuse compactor, extends at least partly over the rear side of the driver's cab and a respective possibility of a view to the rear towards the region situated behind the refuse compactor is provided by the vision recess. It can be provided for this purpose that the driver's cab and the air intake device are situated opposite of each other in a virtually planar way. It is preferable, however, if the driver's cab and the air intake device are arranged at least partly to engage into each other in a V-shaped manner in the region of the mutually opposite surfaces. The driver's cab ideally tapers to the rear in the forward direction of the refuse compactor in the horizontal plane towards the center of the machine and is partly overlapped in this region by the air intake device. This achieves optimal utilization of the available space on the one hand because more area is produced in the cross-section for the conduction of air in the air intake device and the space in the driver's cab is only limited where the driver is usually not present in conventional driver's cabs. As a result, the driver's cab will impact the wall of the air intake device during a lateral load from a specific deflection, thus producing an increased ROPS effect again.

BRIEF DESCRIPTION OF THE DRAWINGS

The present invention will be explained below in closer detail by reference to embodiments shown in the schematic drawings, wherein.

Like components are provided in the drawings with like reference numerals, wherein components that repeat themselves are not necessarily specified separately in each of the drawings.

DETAILED DESCRIPTION OF THE INVENTION

Figure 1:
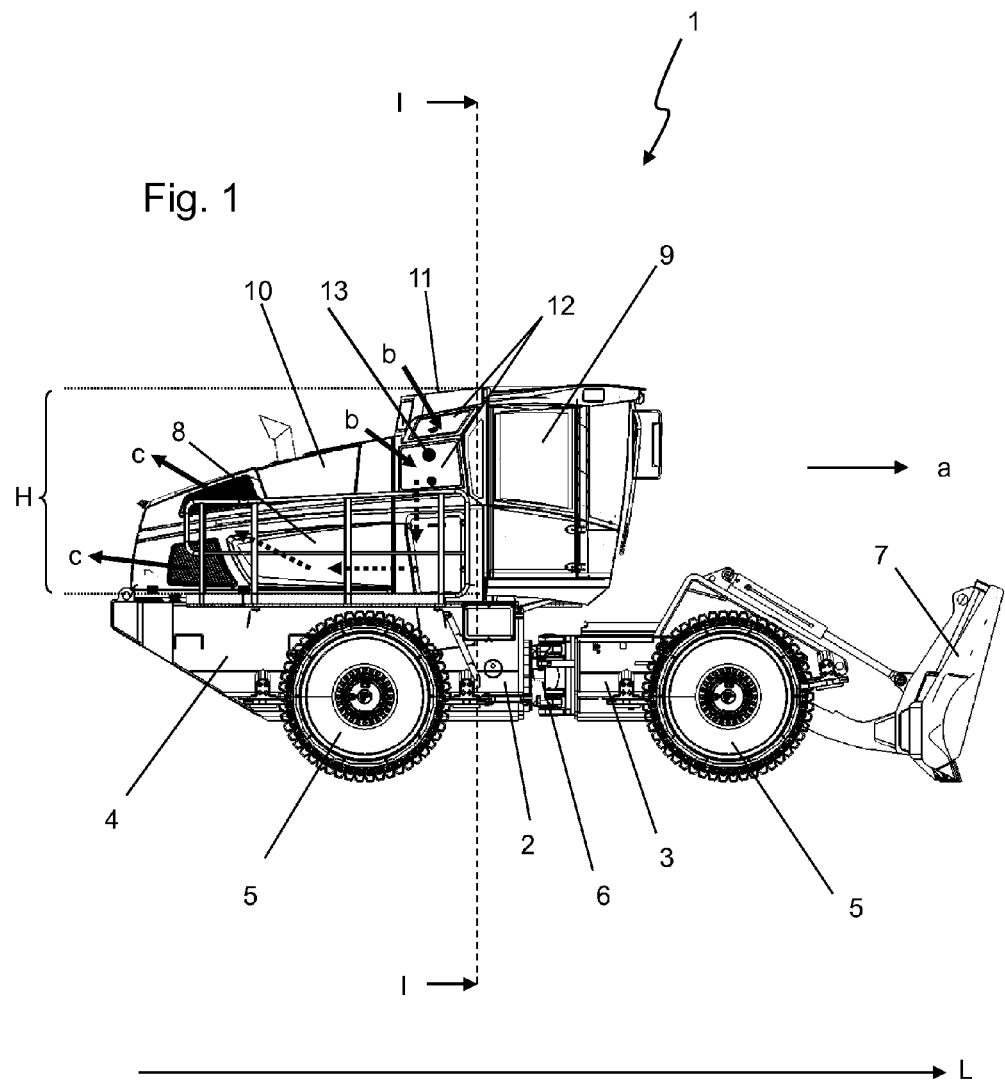
FIG. 1 shows a side view of a refuse compactor.

Relevant elements of the refuse compactor 1 are a machine frame 2 with a front frame 3 and a rear frame 4, transportation devices 5 mounted on the machine frame 2, which in the present case are arranged as padfoot drums, an articulated joint 6 via which the front frame 3 and the rear frame 4 are connected to each other, a push blade 7 mounted on the front frame 3, and a drive motor 8 (covered in the present case by the hood 10) on the rear frame, and a driver's cab 9. A further relevant element is an air intake device 11, which is arranged behind the driver's cab 9 in the forward or working direction a of the refuse compactor 1. In working operation, the refuse compactor 1 moves over the refuse to be compacted, crushed and/or displaced, especially in and against the forward direction a. This requires considerable cooling air supply of the drive motor 8. Ambient air is sucked in for this purpose in the direction of arrow b via the air intake device 11 and conducted in the interior (dashed arrows) of the air intake device 11 to the drive motor 8 and emitted again via the outlet openings in the direction of arrow c via the hood 10 to the outside environment. It can also be provided in addition, or as an alternative, that ambient air is taken in via the air intake device 11, which can be used for the air supply of the interior space of the driver's cab 9 when conditioned accordingly. A plurality of intake openings 12 is provided for the intake of air in the air intake device 11.

Figure 2:
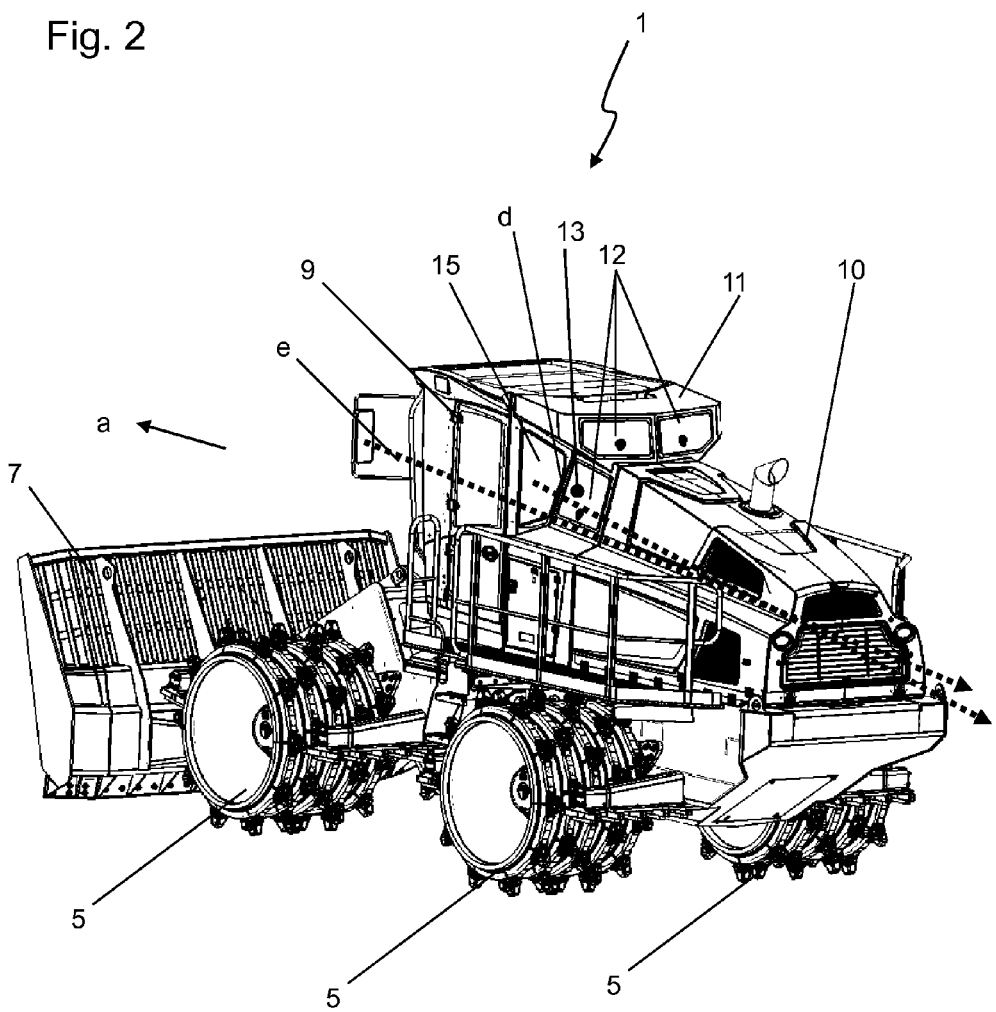
FIG. 2 shows a perspective oblique view of the refuse compactor of FIG. 1 obliquely from behind.
Figure 3:
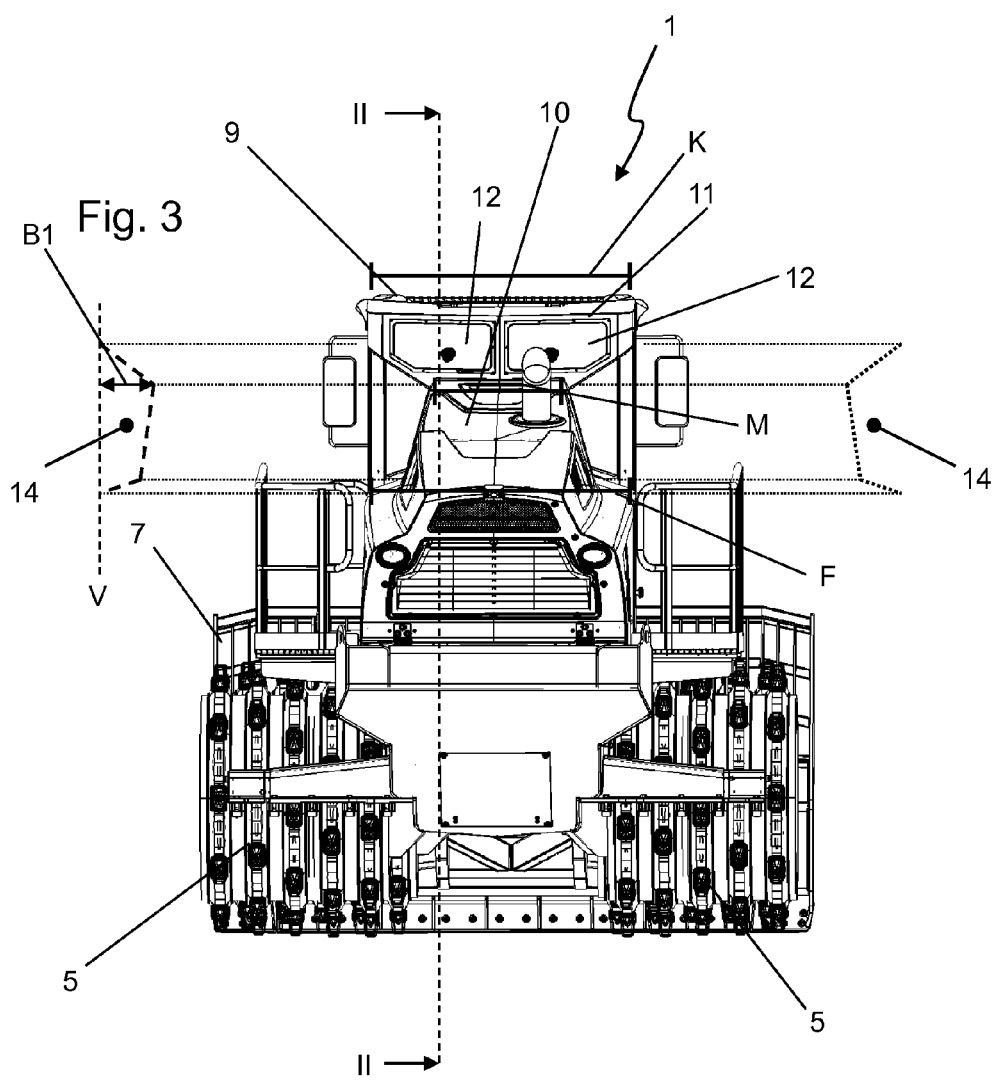
FIG. 3 shows a rear view of the refuse compactor of FIGS. 1 and 2.

The air intake device 11 extends with respect to its height H in the vertical direction up to the upper roof region of the driver's cab 9 and is substantially flush with said roof region towards the top. The width B of the air intake device 11, i.e., its extension in the horizontal plane transversely to the forward direction a, corresponds in the roof region substantially to the driver's cab 9. FIGS. 2 and 3 illustrate, in particular, that the arrangement of the air intake device 11 in the travelling direction behind the driver's cab 9 can potentially represent a visual obstruction to the driver of the refuse compactor 1 who is situated in the driver's cab 9, especially when said compactor is arranged as previously known from the prior art (not shown in the drawings).

It is provided in the arrangement of the refuse compactor 1 according to one aspect of the present invention that at least the air intake device 11 comprises at least one vision recess 13, through which a driver situated in the driver's cab 9 can see the region situated in the rearward direction behind the refuse compactor 1 at least in part, either by looking over his shoulder or through a rear-view mirror. A vision recess 13 is respectively provided in the present embodiment on both sides of the air intake device 11 situated substantially parallel in straight travel to the forward or working direction a of the refuse compactor. The progression of the vision axis of the driver situated in the driver's cab 9 is illustrated in FIG. 2 by the arrow d (for a view over the driver's shoulder) and e (for a view through the rear-view mirror along the vision recess 13). The vision recesses 13 are, thus, not framed circumferentially, but are provided with an open configuration on each respective side, i.e., perpendicularly to the outside relating to the longitudinal extension L (FIG. 1) of the refuse compactor, i.e., to the right or left relating to the longitudinal extension L. The vision recesses 13 thus represent depressions oriented towards the interior of the machine and coming from the right or left external side, relating to the entire outside surface of the refuse compactor 1, which depressions form a channel of vision extending from the driver's cab to the rear.

Specifically, a depression 14 or indentation which is open towards the side of the refuse compactor 1 is provided in the exterior surface of the air intake device 11 for the purpose of forming the vision depressions 13 in the air intake device 11 on each side. This is shown, in particular, in FIG. 3, for example, in which the progression of the surface of the vision recesses 13 on either side of the refuse compactor has been moved up and to the side. The depression or indentation relates to a progression of the external surface of the air intake device 11 in the vertical direction which occurs at least in the region of the lateral recess 13 towards the center of the machine 13, wherein the head region and the base region extend in an offset fashion in the vertical direction with respect to the region of the lateral recess farther to the outside or farther from the middle of the refuse compactor 1. With respect to its spatial configuration, the air intake device 11 thus substantially comprises a base area F which is wide with respect to the lateral extension, a central region M which in contrast is narrower towards the center, and a head region K which protrudes towards the sides, as shown in FIG. 3 in closer detail. At least with respect to the upper cross-section, the air intake device 11 thus has a T-shaped cross-section which comprises the head region K and the middle region M.

Concerning the width B of the air intake device 11, the vision recess has a width B1 of 0.2 B in the air intake device 11 with respect to the vertical V. The depression 14 is provided with an indented configuration with respect to the cross-section of the machine in a vertical plane perpendicularly to the forward direction a, in other words, up to a maximum of up to one-fifth of the maximum width of the air intake device 11 towards the center of the machine.

The vision recess 13 ends with a window 15 towards the driver's cab 9, so that the driver is able to see in the rearward direction from the driver's cab 9 along the vision recess. The vision recess 13 or the depression/indentation 14 thus extends from the driver's cab 9 substantially parallel to the longitudinal axis of the refuse compactor 1 in the working direction a to the rear.

In the present embodiment, the configuration of the vision recess 13 is not limited to the respective depressions 14 in the outside surface of the air intake device 11, but continues seamlessly to the rear in the hood 10. A cross-sectional arrangement is present there which is complementary to the air intake device 11 in the transitional region. The vision recesses 13 thus extend on both sides originating from the driver's cab 9 and free from any visual obstructions through the air intake device 11 via the hood 10 up to the rear end of the refuse compactor, so that a continuous channel of vision is provided for the driver situated in the driver's cab over the entire rear machine region of the refuse compactor 1. Furthermore, the vision recess 13 is arranged in a curved manner with its base in the direction downwardly to the rear and to the center of the refuse compactor, especially in the region of the hood 10. As a result, the visual conditions for the driver are improved especially in the region close to the rear of the refuse compactor.

A further important feature of the present embodiment is that the air intake device 11 is arranged in part as an ROPS structure acting for the driver's cab 9. The driver's cab 9 and the air intake device 11 are, thus, connected to each other via the connecting devices 16, the specific configuration of which will be described below in closer detail. The effect of this arrangement is that any loads acting on the driver's cab, especially lateral loads horizontally and transversely to the forward direction a, are diverted at least partly to the air intake device 11, so that the deformation risk of the driver's cab 9 under respective loads is reduced.

Figure 4:
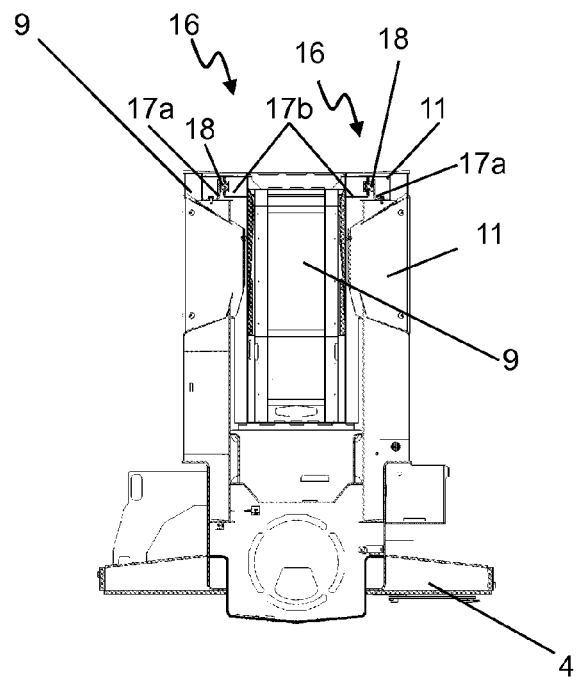
FIG. 4 shows a sectional view of a partial area of the refuse compactor along the line I-I of FIG. 1.
Figure 5:
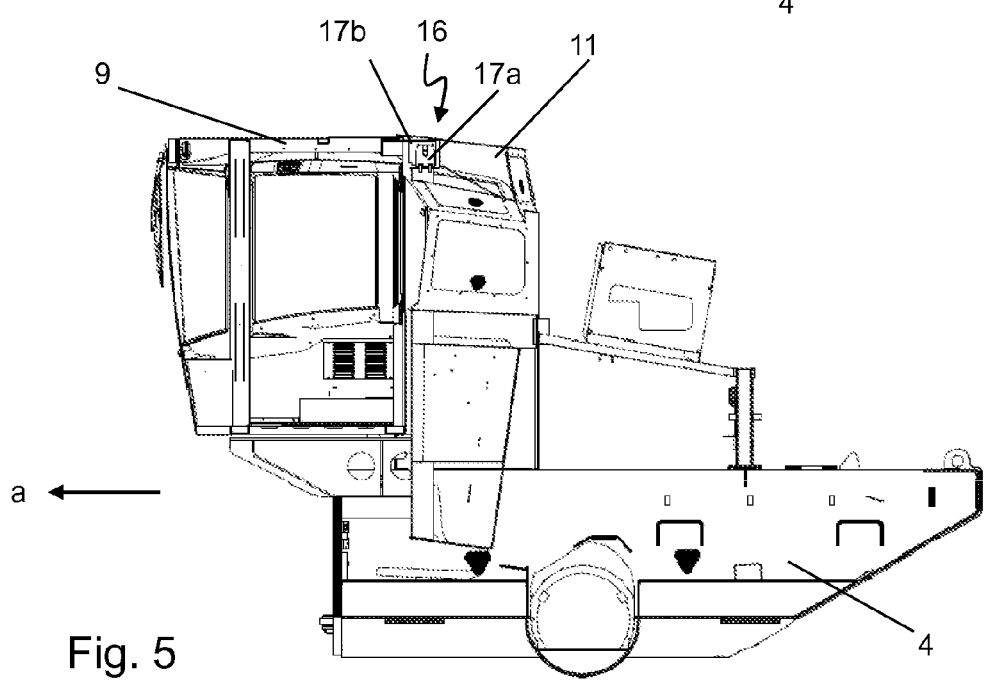
FIG. 5 shows a sectional view along the line II-II of a partial area of the refuse compactor of FIG. 3.

The driver's cab 9 and the air intake device 11 are not stiffly connected to each other, but are elastic within a determined area. Retaining lugs 17 (17a on the driver's cab and 17b on the air intake device 11) are respectively provided as a part of the connecting device 16 on the driver's cab 9 and the air intake device 11, as are shown, for example, in the sectional views according to FIG. 4 (along the line I-I in FIG. 1) and FIG. 5 (along the line II-II in FIG. 3). The illustrations do not show the fact that in total more than two connecting devices 16 are present between the driver's cab 9 and the air intake device 11. The retaining lugs 17 are respectively connected in pairs to each other via an elastomeric element 18. The arrangement of the retaining lugs 17 is made in such a way that they are opposite of each other horizontally and transversely to the forward direction a. The connecting axis between the retaining lugs 17a and 17b, which is produced by the elastomeric element 18, thus extends horizontally and transversely to the working direction a. In the case of lateral loads on the driver's cab, e.g., when the machine has tipped over, loading forces are, thus, transmitted virtually perpendicularly between the contact surfaces of the retaining lugs 17a and 17b on the elastomeric element 18, so that in this case tensile and pressure loads occur virtually exclusively on the elastomeric element, but virtually no shearing stresses at the same time. This arrangement of the assembly consisting of the driver's cab 9 and the air intake device 11 results in an overall structure which can be loaded to a relatively high extent, and, in addition to the conduction of air and a clear field of vision, the air intake device 11 assumes a stabilizing function for the driver's cab 9.

Figure 6:
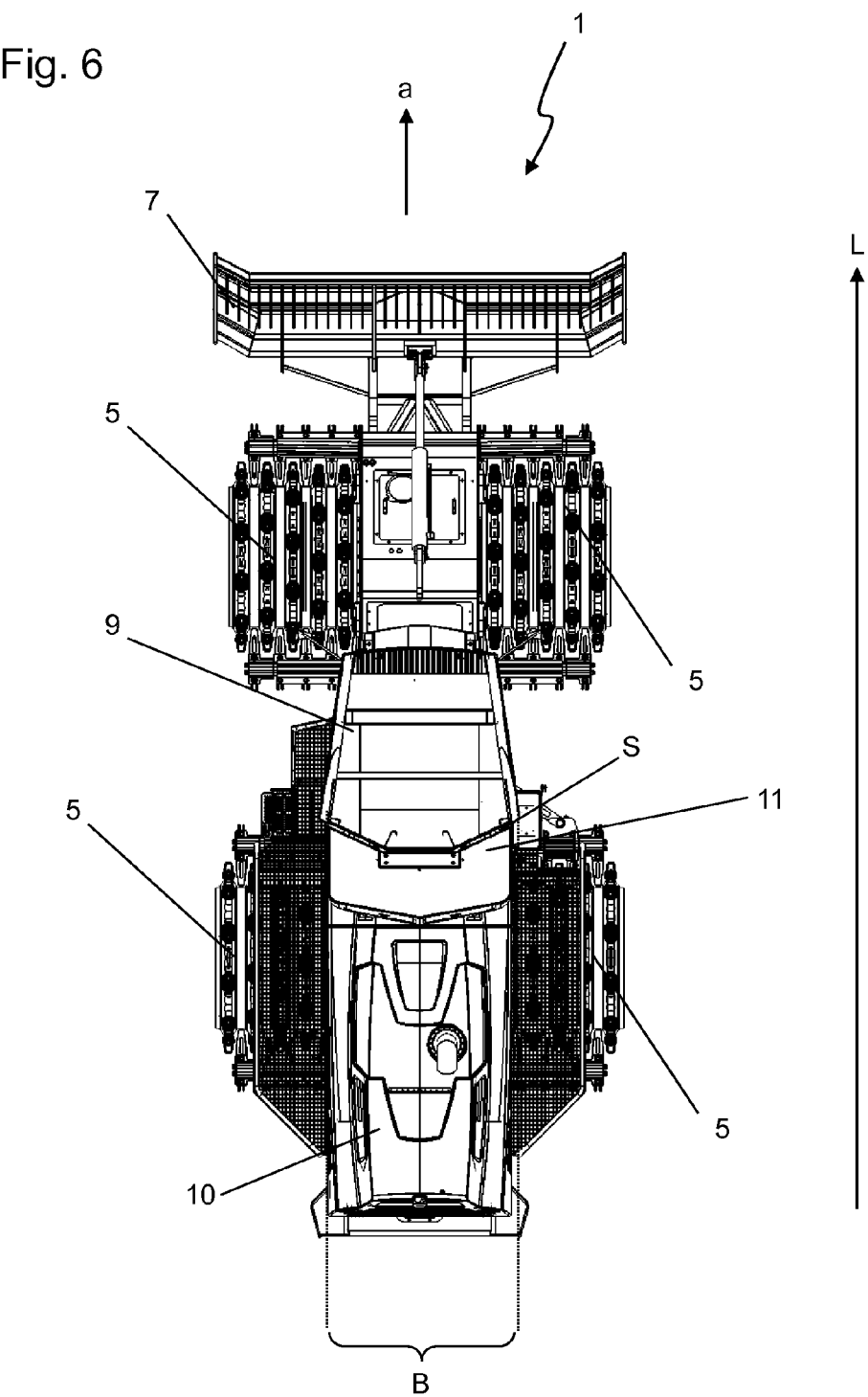
FIG. 6 shows a top view of the refuse compactor according to FIGS. 1 to 3.

A further detail of the refuse compactor 1 according to one embodiment of the present invention is especially provided from the top view of FIG. 6. FIG. 6 illustrates that the driver's cab is provided with a tapering arrangement with respect to its outer circumference in the horizontal plane to the rear and to the middle in the direction of the air intake device 11. The air intake device 11, which is arranged in a complementary manner in this region and is spaced via a spacing gap S, accordingly comprises a V-shaped cross-section and engages behind or overlaps the driver's cab 9 to the side of the refuse compactor 1 from the middle to the outside. As a result of this partial overlap, the driver's cab is further secured against lateral tilting relative to the machine frame 2.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A refuse compactor, comprising a machine frame, transportation devices, a drive motor, a driver's cab which is arranged on the machine frame, and an air intake device with at least one intake opening, wherein the air intake device is arranged behind the driver's cab relative to a forward direction of the refuse compactor and extends at least partly over a rear side of the driver's cab in a horizontal direction and up to a roof of the driver's cab in a vertical direction, and further wherein the air intake device comprises at least one vision recess which is open to one side of the refuse compactor situated substantially parallel to the working direction of the refuse compactor during straight travel and which is arranged in such a manner that a driver of the refuse compactor is able to see a region situated behind the refuse compactor at least in part from the driver's cab through the vision recess.

2. The refuse compactor according to claim 1,
wherein the air intake device, originating from an upwardly extending central part, comprises one respective vision recess on both sides of the refuse compactor situated during straight travel substantially parallel to the working direction of the refuse compactor.

3. The refuse compactor according to claim 2,
wherein the air intake device has a T-shaped structure and a roof region extending on both sides of the refuse compactor, which sides are situated during straight travel substantially parallel to the working direction of the refuse compactor, and further wherein the roof region is upwardly adjacent in the vertical direction to the central part.

4. The refuse compactor according to claim 1, wherein the width of the at least one vision recess in the horizontal direction and transversely to the forward direction lies at most in the range of 0.1 to 0.4, especially 0.15 to 0.3, an even more especially 0.2 to 0.25 of the width of the driver's cab.

5. The refuse compactor according to claim 1, wherein the at least one vision recess extends from the rear side of the driver's cab up to close to the rear end of the refuse compactor.

6. The refuse compactor according to claim 1, wherein the air intake device is part of an ROPS structure.

7. The refuse compactor according to claim 1, wherein the air intake device is connected to the driver's cab via a connecting device.

8. The refuse compactor according to claim 7, wherein the connecting device on the driver's cab and/or the air intake device comprises retaining lugs which are arranged for accommodating at least one elastomeric connecting element.

9. The refuse compactor according to claim 8, wherein the retaining lugs on the driver's cab and the air intake device are arranged opposite of each other horizontally and transversely to the forward direction of the refuse compactor.

10. The refuse compactor according to claim 1, wherein the driver's cab and the air intake device are arranged at least partly to engage into each other in a V-shaped manner in the region of the mutually opposite surfaces.

11. The refuse compactor according to claim 1, wherein the air intake device is connected to a rear side of the driver's cab.

* * * * *